US007991438B2

(12) United States Patent
Hans et al.

(10) Patent No.: US 7,991,438 B2
(45) Date of Patent: *Aug. 2, 2011

(54) MOBILE TELECOMMUNICATIONS TERMINAL

(75) Inventors: Martin Hans, Hildesheim (DE); Frank Kowalewski, Salzgitter (DE); Josef Laumen, Hildesheim (DE); Gunnar Schmidt, Wolfenbuettel (DE); Siegfried Baer, Pforzheim (DE); Mark Beckmann, Braunschweig (DE)

(73) Assignee: IPCOM GmbH & Co. KG, Pullach (DE)

(*) Notice: Subject to any disclaimer, the term of this patent is extended or adjusted under 35 U.S.C. 154(b) by 12 days.

This patent is subject to a terminal disclaimer.

(21) Appl. No.: 12/482,778

(22) Filed: Jun. 11, 2009

(65) Prior Publication Data

US 2010/0151829 A1 Jun. 17, 2010

Related U.S. Application Data

(63) Continuation of application No. 10/149,095, filed as application No. PCT/DE00/04029 on Nov. 15, 2000, now Pat. No. 7,565,181.

(30) Foreign Application Priority Data

Dec. 7, 1999 (DE) .................................. 199 58 777

(51) Int. Cl.
*H04B 1/38* (2006.01)
(52) U.S. Cl. ....... 455/574; 455/298; 455/522; 455/13.4; 455/127.1; 455/127.5
(58) Field of Classification Search .................. 455/574, 455/298, 522, 13.4, 127.1, 127.5
See application file for complete search history.

(56) References Cited

U.S. PATENT DOCUMENTS

| 5,448,759 A | 9/1995 | Krebs et al. |
| 5,673,256 A | 9/1997 | Maine |
| 6,006,351 A | 12/1999 | Peretz et al. |
| 6,701,378 B1 | 3/2004 | Gilhuly et al. |
| 6,870,890 B1 | 3/2005 | Yellin et al. |
| 2001/0012302 A1 | 8/2001 | Gaffney |

FOREIGN PATENT DOCUMENTS

EP  0 650 306  4/1995

(Continued)

OTHER PUBLICATIONS

3$^{rd}$ Generation Partnership Project; Technical Specification Group Services and System Aspects, Service Aspects; Stage 1, Multimedia Messaging Service (3G TS 22.140 version 0.1.0), Jul. 1999.

(Continued)

*Primary Examiner* — Wayne Cai
(74) *Attorney, Agent, or Firm* — Kenyon & Kenyon LLP

(57) ABSTRACT

A mobile telecommunications terminal is provided, which makes possible, so as to use the least possible amount of power, a query of messages present for the mobile telecommunications terminal in a telecommunications network. The mobile telecommunications terminal includes a receiving device for receiving messages from the telecommunications network in a receive mode. At the mobile telecommunications terminal, a query mode can be established, in which a control unit, in the event that the receive mode is switched off, activates the receive mode at at least one first predetermined time. The control unit checks whether, within a second predetermined time period after the activation of the receive mode, information was received in the receiving device regarding at least one message present in the telecommunications network (10) for the mobile telecommunications terminal.

12 Claims, 3 Drawing Sheets

FOREIGN PATENT DOCUMENTS

| | | |
|---|---|---|
| EP | 0 782 359 | 7/1997 |
| EP | 0 854 655 | 7/1998 |
| GB | 2 244 409 | 11/1991 |
| GB | 2 309 138 | 7/1997 |
| WO | WO 95/29568 | 11/1995 |
| WO | 98/48549 | 10/1998 |
| WO | WO 99/61966 | 12/1999 |

OTHER PUBLICATIONS $3^{rd}$ Generation Partnership Project; Technical Specification Group Terminals; Multimedia Messaging Service (MMS); Stage 2 (3G TS 23.140 version 0.1.0), Oct. 1999.

$3^{rd}$ Generation Partnership Project; Technical Specification Group Radio Access Netwotk; UE Procedures in Idle Mode (3G TS 25.304 version 3.0.0), Oct. 1999.

GSM Recommendation 03.13, version 3.0.1, Apr. 1989.

Sevanto, J., "Multimedia Messaging Service for GPRS and UMTS," IEEE Wireless Communications and Networking Conference: Conference Record, Sep. 1999.

$3^{rd}$ Generation Partnership Project (3GPP); Technical Specification Group Terminals (TSG-T); Working Group 2 Mobile Terminal Services and Capabilities; Draft Meeting Report (T2#6/SMG4 Report version 0.4), Oct. 1999. (Anlage K20).

$3^{rd}$ Generation Partnership Project (3GPP); Technical Specification Group Terminals (TSG-T); Working Group 2 Mobile Terminal Services and Capabilities; Draft Meeting Report (T2#6/SMG4 Report version 0.4), Oct. 1999. (Anlage K20a).

Annex 6: ETSI Intellectual Property Rights Policy, Nov. 2000.

European Search Report in Application No. EP 03 02 4480, dated Mar. 2004.

$3^{rd}$ Generation Partners Group, UMTS Report, version 1, TSG SA WG1#4 99-4 Plenary Meeting, Jul. 1999. (Anlage K23).

$3^{rd}$ Generation Partners Group, UMTS Report, version 1, TSG SA WG1#4 99-4 Plenary Meeting, Jul. 1999. (Anlage K23a).

MOBILE TELECOMMUNICATIONS TERMINAL

CROSS-REFERENCE TO RELATED APPLICATION

The present application is a continuation patent application of U.S. patent application Ser. No. 10/149,095 filed on Oct. 1, 2002 now U.S. Pat. No. 7,565,181, which was a U.S. National Phase Patent Application based on International Patent Application No. PCT/DE00/04029, filed on Nov. 15, 2000, and which claims priority to German Patent Application No. DE 199 58 777.9, filed on Dec. 7, 1999, all of which are hereby incorporated by reference in their entirety.

FIELD OF THE INVENTION

The present invention relates to a mobile telecommunications terminal.

BACKGROUND INFORMATION

In mobile radio systems configured according to the GSM standard (Global System for Mobile Communications), the SMS short message service can be used. A mobile telephone that can be accessed via the mobile radio network and that is contacted on the mobile radio network is in a receive mode, in which it can receive SMS short messages from the mobile radio network via a receiving device.

SUMMARY OF THE INVENTION

In contrast, the mobile telecommunications terminal according to the present invention has the advantage that a query mode can be established on the mobile telecommunications terminal, in which a control unit, in the event that the receive mode is switched off, can activate the receive mode at at least one first predetermined time, and in which the control unit checks whether, within a second predetermined time period after the activation of the receiver operating mode, information was received in the receiving device regarding at least one message present in the telecommunications network for the mobile telecommunications terminal. In this way, the mobile telecommunications terminal can switch itself automatically into the receive mode at the at least one first predetermined time and can be contacted in the telecommunications network. The mobile telecommunications terminal therefore does not have to be continually operated in the receive mode in order to be able to detect the reception of messages from the telecommunications network. Rather, the mobile telecommunications terminal automatically switches to the receive mode at at least one first predetermined time to check whether in the meantime one or more messages are present in the telecommunications network for the mobile telecommunications terminal. If the user of the mobile telecommunications terminal switches the receive mode off, for example, so as not to be disturbed by incoming calls, or to achieve an extension of the standby time, the user can nevertheless be informed concerning the reception of messages. Because the mobile telecommunications terminal for this purpose does not have to be continually operated in the receive mode in accordance with the present invention, energy can be saved and the service life can be lengthened when operated using a storage battery, without having to forego information concerning messages that are present for the mobile telecommunications terminal in the telecommunications network.

According to one embodiment, the control unit switches the receive mode off no sooner than after a third predetermined time period beginning from the activation of the receive mode. In this manner, a sustained activation of the receive mode is prevented after the automatic switching on, and therefore power is saved.

A further advantage can be seen in the fact that the control unit once again switches off the receive mode no sooner than after an evaluation of all messages that are present in the telecommunications network for the mobile telecommunications terminal. In this way, the operating time for the receive mode can be optimized such that it is selected so as to be no longer but also no shorter than absolutely necessary for the evaluation of the messages, so that, on the on hand, a problem-free evaluation and, on the other hand, the greatest possible power savings are achieved by switching off the receive mode after evaluation of the messages.

The control unit initiates an evaluation of the at least one message in the event that it detects the reception of information for at least one message present in the telecommunications network for the mobile telecommunications terminal. In this way, a message present in the telecommunications network for the mobile telecommunications terminal can be further processed automatically, i.e., without user interaction, and therefore in an especially convenient manner for the user.

The present invention provides a further advantage in the fact that the type of evaluation, especially as a function of the type of message, can be stipulated via an input unit of the mobile telecommunications terminal. In this way, the automatic evaluation can be adjusted to the requirements of the user via the control unit.

A further advantage is provided by the fact that the evaluation of the at least one message includes an acoustical and/or optical signaling on a reproducing device of the mobile telecommunications terminal. In this manner, the user of the mobile telecommunications terminal can be informed regarding one or a plurality of messages present for him in the telecommunications network.

A further advantage can be seen in the fact that the control unit maintains the signaling beyond the switching off of the receive mode. In this manner, it is possible to assure that the user is informed regarding the presence of the least one message, especially when the signaling can only be terminated by user interaction.

According to a further embodiment, the control unit, in the evaluation of the at least one message, sets up a connection to the telecommunications network via a transmitting device of the mobile telecommunications terminal, in particular at a fourth predetermined time, to download the at least one message from the telecommunications network into the mobile telecommunications terminal. In this way, one or a plurality of messages present for the user of the mobile telecommunications terminal in the telecommunications network can be transmitted from the telecommunications network to the mobile telecommunications terminal automatically, i.e., without user interaction, and at the mobile telecommunications terminal the message can be reproduced so that the user is conveniently informed regarding the content of the message or messages.

According to another embodiment, a further advantage is achieved as a result of the fact that the control unit in the query mode stipulates the at least one first predetermined time for activating the receive mode as a function of the instantaneously present capacity of a storage battery of the mobile telecommunications terminal. In this manner, the capacity of the storage battery can be prevented from decreasing too rapidly, in that the receive mode in the query mode is switched on more seldom, i.e., at greater temporal intervals, to increase the service life of the mobile telecommunications terminal and to save power. Conversely, when the capacity of the storage battery is sufficient, the receive mode in the query mode is switched on at shorter temporal intervals, so as to be able as early as possible to query incoming messages for the mobile telecommunications terminal in the telecommunications network.

According to another embodiment, a further advantage is provided in that the control unit in the query mode activates the receive mode at regular time intervals. In this manner, it is assured that incoming messages in the telecommunications network for the mobile telecommunications terminal are detected sooner or later, without having to permanently switch on the receive mode for this purpose.

A further advantage can be seen in the fact that the control unit in the query mode stipulates the at least one first predetermined time for activating the receive mode as a function of the accessibility of the mobile telecommunications terminal in the telecommunications network achieved in the most recently established receive mode. In this manner, for example, when accessibility is poor, or when there is no accessibility of the mobile telecommunications terminal in the telecommunications network, a more frequent activation of the receive mode in the query mode can be set, so that it is possible, as rapidly as possible after regaining the accessibility of the mobile telecommunications terminal in the telecommunications network, to make up for an unsuccessful checking of messages present for the mobile telecommunications terminal in the telecommunications network on account of the insufficient accessibility of the mobile telecommunications terminal in the telecommunications network. If accessibility is once again assured, then the temporal intervals between the activation time points for the receive mode in the query mode can once again be increased to the originally predetermined value, assuming that activation is provided in regular temporal intervals.

DETAILED DESCRIPTION

Figure 1:
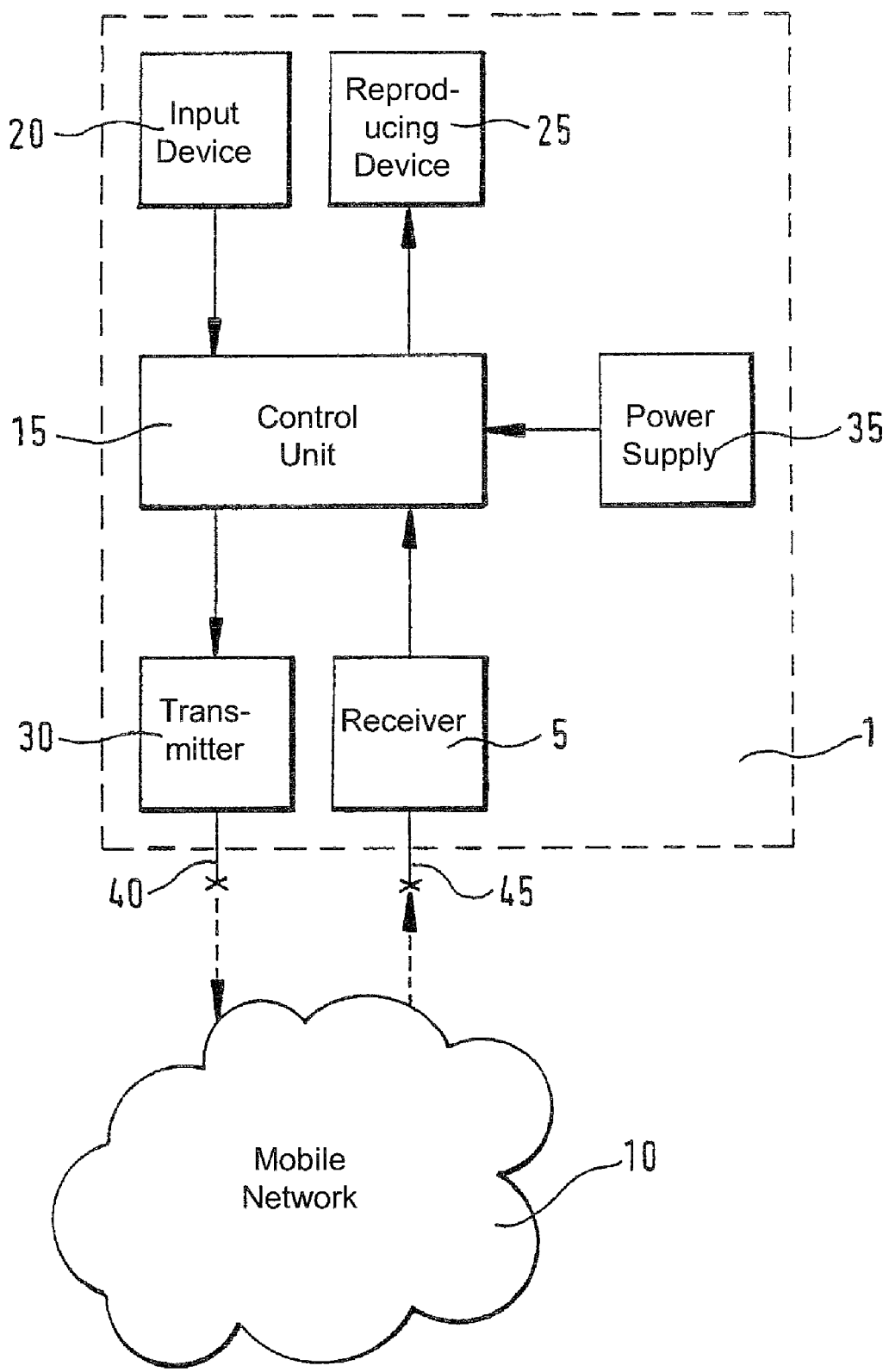
FIG. 1 depicts a block diagram of a mobile telecommunications terminal according to an embodiment of the present invention.

A mobile telecommunications terminal in a mobile radio network can be accessed when it is connected to the mobile radio network. If it is not connected, because, for example, it is switched off or it is not switched to a receive mode or because for technical reasons no connection can be set up between the mobile telecommunications terminal and a base station of the mobile radio network, then the possibility exists to divert incoming calls for the mobile telecommunications terminal in the mobile radio network, for example, to a so-called voice-mail box, in the event the calls are voice calls, i.e., voice messages. The voice-mail box therefore represents a telephone answering machine in the mobile radio network. The mobile telecommunications terminal, i.e., the user of same, is then subsequently informed regarding the received call, as soon as he can once again be accessed for the mobile radio network, and can query the voice-mail box accordingly. The notification of the mobile telecommunications terminal regarding a received call in the mobile radio network for the mobile telecommunications terminal or a message received in the mobile radio network for the mobile telecommunications terminal is currently usually carried out, in this context, via a short message service, such as, for example, in accordance with the SMS standard (Short Message Service) in a mobile radio network that is configured, for example, in accordance with the GSM standard (Global System for Mobile Communications).

A short-message service, such as provided according to the SMS standard, is based on the principle of the so-called "Store-and-Forward," i.e., that messages are generally forwarded via a network unit in the mobile radio network, which can be configured, for example, in accordance with the GSM standard as a service center and which stores each message before it can be conveyed to the addressed receiver. If the addressed receiver in the form of the mobile telecommunications terminal is not available to the mobile radio network, because it cannot be accessed in the mobile radio network, i.e., it is not contacted, then the message addressed to him is stored in the network unit. If the receiver once again becomes accessible to the mobile radio network, then this is signaled to the network unit, for example, using a so-called HLR (Home Location Register), and the message addressed to the receiver, or the messages addressed to the receiver, are automatically conveyed to the receiver. Short-message services of this type are also used for notifying the mobile telecommunications terminal regarding messages that are present in the telecommunications network for the mobile telecommunications terminal from other services, for example, from Internet e-mail services.

According to the present invention, a mobile telecommunications terminal independently switches to a receive mode, for example, at predetermined temporal intervals and which is contacted in a telecommunications network. The receive mode then remains active as long as it is necessary, for example, to transmit from a network unit of the telecommunications network to the mobile telecommunications terminal all of the messages present in the telecommunications network for the mobile telecommunications terminal. After reception of the messages, it is then optionally possible to provide that the mobile telecommunications terminal once again independently switches off the receive mode.

In FIG. 1, a mobile telecommunications terminal of this type is designated using reference numeral 1. In this context, the terminal can be, for example, a mobile telephone. Mobile telecommunications terminal 1, in this context, represents a subscriber of a telecommunications network 10, which can be configured, for example, as a mobile radio network. In what follows, by way of example, the assumption is made that mobile telecommunications terminal 1 is configured as a mobile telephone and telecommunications network 10 is configured as a mobile radio network. Mobile radio network 10 and mobile telephone 1, can be configured, for example, in accordance with the GSM standard (Global System for Mobile Communications) or in accordance with the UMTS standard (Universal Mobile Telecommunications System). Mobile telephone 1 includes a control unit 15, to which an input unit 20 and a reproducing device 25 are connected. Reproducing device 25 can be an acoustical and/or optical reproducing device. For this purpose, reproducing device 25 can include a loudspeaker and/or one or a plurality of optical display elements. In this context, as optical indicating elements, it is possible to provide light-emitting diodes (LED) and/or a display. Mobile telephone 1 also includes a transmitting device 30 and a receiving device 5, both of which are connected to control unit 15. Mobile telephone 1 also includes a power supply 35, configured, for example, as a storage battery, which provides power to the components of mobile telephone 1 in a manner not depicted in FIG. 1. Power supply 35 provides to control unit 15 a signal, which contains information regarding the instantaneous capacity of the power supply 35. Connected to transmitting device 30 is a transmitting antenna 40. Connected to receiving device 5 is a receiving antenna 45. Transmitting antenna 40 and receiving antenna 45 can also be combined into a common transmitting/receiving antenna, for example, via an antenna diplexer. The transmitting device 30 and receiving device 5 allow mobile telephone 1 to exchange signals with mobile radio network 10.

Via input unit 20, mobile telephone 1 can be switched to a receive mode, in which control unit 15 via transmitting device 30 attempts to connect mobile telephone 1 to mobile radio network 10, in order to be able to receive incoming calls or messages for mobile telephone 1. Mobile telephone 1 in the receive mode is receive-ready for incoming calls or messages of this type from mobile radio network 10.

Mobile telephone 1 can be switched to a query mode, for example, via a user input at input unit 20, in which control unit 15 activates the receive mode at at least one first predetermined time in the event that the receive mode is switched off. For this purpose, control unit 15 connects mobile telephone 1 to mobile radio network 10 and checks whether, within a second predetermined time period after the activation of the receive mode, information was received from a network unit of mobile radio network 10 in receiving device 5 via receiving antenna 45 regarding at least one message present in mobile radio network 10 for mobile telephone 1. The at least one first predetermined time for activating the receive mode can be stipulated by the user of mobile telephone 1 at input unit 20. In this context, it can be provided that a receive mode established in the query mode is maintained until it is once again switched off by the user at input unit 20. However, it can also be provided that a receive mode that is switched on in the query mode is automatically switched off once again after a predetermined time period to save power. For this purpose, control unit 15 can include, for example, a timing element, which switches off the receive mode no sooner than after a third predetermined time period beginning from the activation of the receive mode. The third predetermined time period, in this context, can be set so that, when messages present in mobile radio network 10 for mobile telephone 1 are detected, a complete evaluation of these messages is made possible by control unit 15, when this evaluation requires the reception of data from mobile radio network 10. It can therefore be assured that control unit 15 switches off the receive mode no sooner than after an evaluation of all messages present in mobile radio network 10 for mobile telephone 1. Only the part of the evaluation during which message are received messages utilizes an activated receive mode, i.e., a connection of mobile telephone 1 to mobile radio network 10 and the accessibility of mobile telephone 1 in mobile radio network 10. Further evaluation steps can also be carried out when the receive mode is switched off. A longer continuation of the receive mode is not useful for reasons of desirable power savings. Therefore, the third predetermined time period can initially be preset by the timing element of control unit 15 at least so that control unit 15, after the activation of the receive mode, on the basis of the information received from mobile radio network 10, can evaluate how many messages are present for mobile telephone 1 in mobile radio network 10. The third predetermined time period can then be extended by control unit 15 as a function of the number of messages in mobile radio network 10 that are present for mobile telephone 1, such that all of these messages can be downloaded into mobile telephone 1 from mobile radio network 10 when receive mode is activated, when this is desired. For this purpose, in the event that the minimum necessary time for downloading a message of this type and the number of messages present for mobile telephone 1 are known, control unit 15 can set the time constant of the timing element so that all messages present for mobile telephone 1 can be downloaded in this manner into mobile telephone 1 in the receive mode. The messages downloaded into mobile telephone 1 are then temporarily stored for further processing in a memory unit not depicted in FIG. 1.

To determine the time required for downloading a message from mobile radio network 10 into mobile telephone 1, control unit 15, having the information regarding the presence of one or a plurality of messages for mobile telephone 1 in mobile radio network 10, receives data regarding the specific message type and/or the specific message format and the specific message size of the messages present for mobile telephone 1. The time required for downloading a message from mobile radio network 10 into mobile telephone 1 is a function of the type and/or the format and the size of the message to be downloaded. Therefore, it can also be provided that the user of mobile telephone 1 can stipulate using input unit 20, up to which size a message present for mobile telephone 1 should be transmitted from mobile radio network 10 into mobile telephone 1, so as to limit the time for the activation of the receive mode and to save power. However, it can additionally or alternatively also be provided that control unit 15 is preset regarding up to which size a message can be downloaded from mobile radio network 10 into mobile telephone 1. In this context, the permissible message sizes can be stipulated at input unit 20 as a function of the message type and/or of the message format, or they can be preset in control unit 15.

As described, in the event that control unit 15, in the receive mode, detects the reception of information via receiving device 5 regarding at least one message present in mobile radio network 10 for mobile telephone 1, it can initiate an evaluation of the at least one message. In this context, it is possible to provide that the type of evaluation to be initiated can be stipulated by the user of mobile telephone 1 at input unit 20. Additionally or alternatively, it can also be provided that the type of evaluation is preset in control unit 15. In this context, the type of the evaluation can be stipulated by the user at input unit 20 as a function of the message type and/or the message format, or it can be preset in control unit 15. In this context, one possible type of evaluation of the at least one message present for mobile telephone 1 in mobile radio network 10 can be characterized by the fact that control unit 15 sets up a connection to mobile radio network 10 via transmitting device 30, to download the at least one message from mobile radio network 10 into mobile telephone 1.

Along with the information transmitted from mobile radio network 10 to mobile telephone 1 regarding a message present in mobile radio network 10 for mobile telephone 1, information can simultaneously be transmitted regarding the type and/or the format of this message. In this context, control unit 15, as a function of the processing capabilities of mobile telephone 1, can be preset such that messages of one or a plurality of predetermined types and/or formats should not be downloaded into mobile telephone 1, because mobile telephone 1 does not support further processing, in particular, the reproduction of these messages on reproducing device 25. In addition, it can be stipulated by the user that messages of one or a plurality of predetermined types and/or formats should not be transmitted to mobile telephone 1, for example, to save power, if the transmission of a message of a specific type and/or format from mobile radio network 10 to mobile telephone 1 is especially time- and therefore energy-intensive.

As message types, it is possible to provide text messages, voice messages, or video messages in various formats, it being possible to carry out the described evaluation also as a function of the message format, so that the user can stipulate at input unit 20 the type of evaluation also as a function of the message format, or the type of evaluation can be stipulated in control unit 15 as a function of the message format. In addition, varying message formats as well as varying message types can result in varying download times for messages downloaded from mobile radio network 10 into mobile telephone 1, because they among other things establish the organization of the transmission of the corresponding messages and therefore the useful data of the message that can be transmitted per time unit.

Voice messages can be present, for example, in the form of voice-mails in a voice-mail box in mobile radio network 10, and they can be downloaded from the voice-mail box into mobile telephone 1. The described downloading procedure can also take place in a time shift to a fourth predetermined time for the activated receive mode, so as to exploit, for example, more favorable transmission rates or field intensity conditions for the transmission of the messages.

A further and simpler type of evaluation can be derived from acoustically and/or optically signaling on reproducing device 25 a message present in mobile radio network 10 for mobile telephone 1. In this context, it can also be provided that control unit 15 maintains the signaling beyond the switching off of the receive mode, either for a predetermined time period or until a user interaction at input unit 20. The downloading of a message that is signaled in this manner from mobile radio network 10 into mobile telephone 1 can then take place at the user's initiative. An optical signaling can occur, for example, by the blinking of a light-emitting diode or by the representation of one or a plurality of alphanumeric signs on a display. An acoustical reproduction can take place via an acoustical signal, for example, a ringing tone.

In what follows, it is now described how the at least one first predetermined time can be stipulated for the activating of the receive mode in the query mode. In this context, it can be provided that control unit 15 in the query mode activates the receive mode at regular time intervals. These time intervals can be stipulated by the user at input unit 20, or they can be preset in control unit 15. Thus it can be provided, for example, to activate the receive mode in the query mode every five minutes. In comparison to a continual activation of the receive mode, power can therefore be saved, although the detection of messages incoming for mobile telephone 1 may be accepted, in this example, as having a delay of a maximum of five minutes. This power saving is advantageous particularly if regular charging opportunities are not provided for power supply 35, for example, during camping or when the charging device is not available.

Additionally or alternatively, it can also be provided that control unit 15 in the query mode stipulates the at least one first predetermined time for activating the receive mode as a function of the instantaneously present capacity of power supply 35. Thus, especially in a query mode in which the receive mode is activated at regular time intervals, it can be provided to enlarge these time intervals as a function of the decreasing capacity of power supply 35, to save power and to maintain as long as possible the service readiness of mobile telephone 1.

It can also be provided that control unit 15 in the query mode stipulates the at least one first predetermined time for activating the receive mode as a function of the accessibility of mobile telephone 1 in mobile radio network 10 that is achieved in the most recently established receive mode. Inaccessibility is present, for example, when mobile telephone 1 cannot be reached from mobile radio network 10 despite the switching on of the receive mode, for example, due to unfavorable field intensity conditions, which make reception of signals from mobile radio network 10 in mobile telephone 1 difficult or make them no longer distinguishable from noise. Inaccessibility of mobile telephone 1 by mobile radio network 10, however, when receive mode is switched on, can also be present if mobile telephone 1 does not have operating permission for mobile radio network 10. Therefore, if in the most recently established receive mode no accessibility of mobile telephone 1 in mobile radio network 10 was achieved, then it can be provided, within the shortest possible time, to begin a new attempt and once again to switch on the receive mode. This is useful especially when the inaccessibility of mobile telephone 1 is due to field intensity fluctuations of the signals received in mobile telephone 1 from mobile radio network 10. If the inaccessibility is due to a non-authorization of mobile telephone 1 in mobile radio network 10, then a longer time interval until the next switching on of the receive mode can be useful to give the user of mobile telephone 1 the opportunity to change the mobile radio network or to receive operating permission in the mobile radio network. In this context, control unit 15 can detect from the signals received in receiving device 5 the reason for which mobile telephone 1 in mobile radio network 10 is not accessible. In response to field intensity fluctuations, control unit 15 within a predetermined time period would not detect any valid receiving signal, whereas in the event of non-authorization a corresponding message from mobile radio network 10 can be detected by control unit 15. Control unit 15 can then stipulate the time point for the next activation of the receive mode in query mode as a function of the detected inaccessibility.

Because the access identification of mobile telephone 1 to mobile radio network 10 is stored in mobile telephone 1, especially in the event of the regular activation of the receive mode, it is useful to secure mobile telephone 1 in the described query mode from unauthorized access through an additional identification number. The distinction is therefore made between the access identification to mobile radio network 10 and an access identification to mobile telephone 1.

Figure 2:
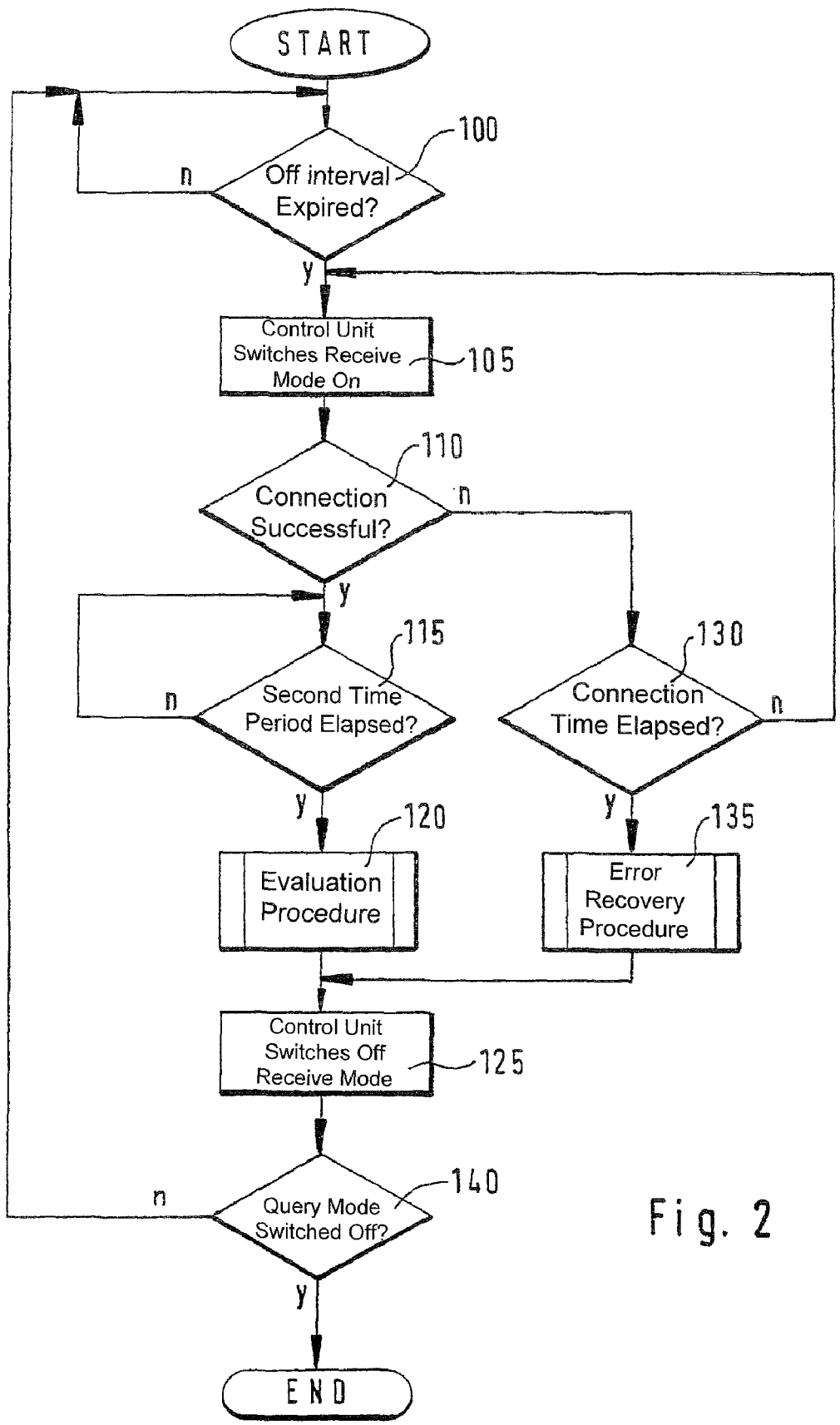
FIG. 2 depicts a flowchart for the mode of functioning of a control unit of the mobile telecommunications terminal according to an embodiment of the present invention.

FIG. 2 depicts an exemplary functional sequence in the query mode, which is also designated as the poll mode. In this context, the distinction is made between the query interval or poll interval, an ON interval, and an OFF interval. The ON interval designates the time in which the receive mode is switched on, i.e., in which mobile telephone 1 is connected to mobile radio network 10. The OFF interval designates the time in which the receive mode is switched off. The query interval is then the sum of the ON interval and the OFF interval, and describes the time of the total query cycle that is formed in this manner.

As long as the OFF interval has not expired and the receive mode is not switched on, so that mobile telephone 1 is, for example, in a so-called sleep mode, nothing happens, so that barely any capacity of power supply 35 is used. At program point 100, control unit 15 checks whether the OFF interval has expired. If this is the case, then a branching occurs to a program point 105, otherwise there is a branching back to program point 100. After the elapsing of the OFF interval, control unit 15 switches the receive mode on at program point 105 at a time point which corresponds to the at least one first predetermined time point, and it attempts to connect via transmitting device 30 to mobile radio network 10. This connecting procedure should be broken off after a predetermined time, if the connecting does not succeed, for example, because no signal is received from mobile radio network 10 in mobile telephone 1 due to field intensity conditions, or mobile telephone 1 is not authorized for mobile radio network 10, or the like. At a program point 110, control unit 15 checks whether the connecting to mobile radio network 10 was successful. If this is the case, then a branching occurs to a program point 115, otherwise a branching occurs to a program point 130. At program point 130, control unit 15 checks whether the time stipulated for the connecting has elapsed. If this is the case, then a branching occurs to program point 135, otherwise the branching returns to program point 105. At program point 135, control unit 15 initiates an error recovery procedure, which processes the unsuccessful connecting to mobile radio network 10, by causing, for example, an error message to be indicated on reproducing device 25, by shortening the time interval to the next switching on of the receive mode, or the like. Subsequently, a branching takes place to a program point 125. If the connecting to mobile radio network 10 succeeds, then control unit 15 at program point 115 checks whether a predetermined notification time interval, i.e., the second predetermined time period from the activation of the receive mode, has elapsed. This is dimensioned such that all notifications from the mobile radio network to mobile telephone 1 can be transmitted with certainty, the notifications containing information regarding the presence of messages for mobile telephone 1 in mobile radio network 10. If the notification time interval has elapsed, then a branching occurs to a program point 120, otherwise the branching returns to program point 115. At program point 120, control unit 15 starts an evaluation procedure, which initiates further activities of mobile telephone 1. At the conclusion of this evaluation procedure, a branching occurs to program point 125, at which control unit 15 once again switches off the receive mode at the third predetermined time point after activating the receive mode, thus once again attaining the starting state. In this context, activities initiated at program point 120, such as the signaling of messages received for mobile telephone 1 in mobile radio network 10, can be maintained longer. At program point 105, the ON interval is therefore switched on, which is once again switched off at program point 125 and is replaced by the OFF interval. After program point 125, a branching occurs to a program point 140, at which control unit 15 checks whether the query mode was switched off at input unit 20 by the user. If this is the case, then the program is exited, otherwise a branching occurs back to program point 100.

Figure 3A:
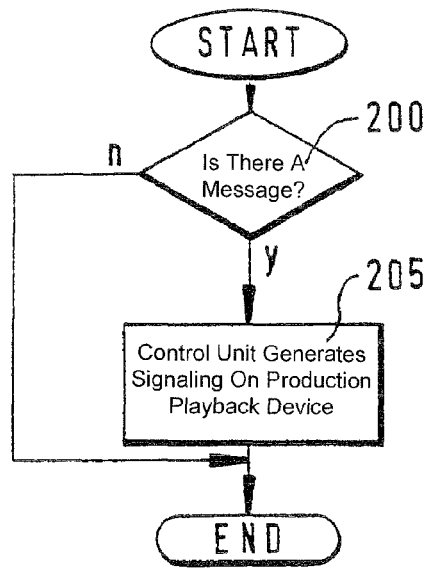
FIG. 3a depicts a flowchart for a first embodiment of a process for evaluation of messages present for the mobile telecommunications terminal in the telecommunications network.
Figure 3B:
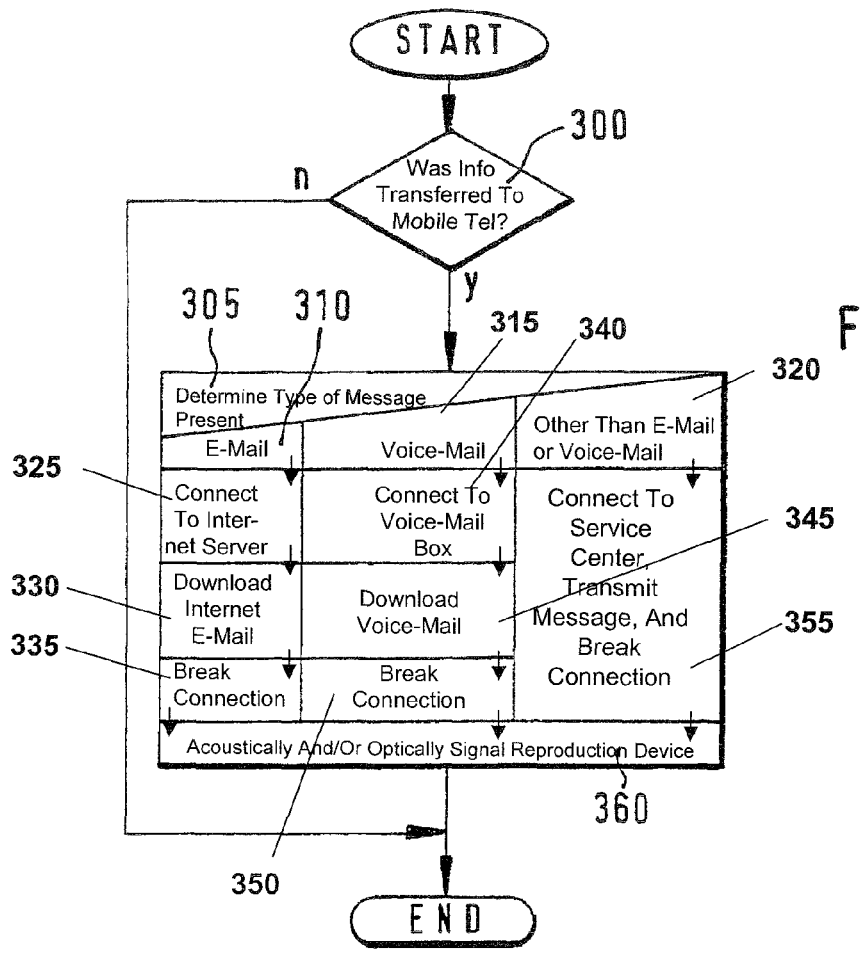
FIG. 3b depicts a flowchart for a second embodiment of a process for evaluation of messages present for the mobile telecommunications terminal in the telecommunications network.

FIGS. 3a and 3b each depict a possible structure of an evaluation procedure. In this context, a first embodiment for an evaluation procedure of this type is represented by FIG. 3a. In this context, control unit 15 at a program point 200, on the basis of the information transmitted in the notification time interval from mobile radio network 10 to mobile telephone 1, checks whether for mobile telephone 1 at least one message is present in mobile radio network 10. If this is the case, then a branching occurs to a program point 205, otherwise the evaluation procedure is exited. At program point 205, control unit 15 brings about a signaling on reproducing device 25 of the at least one message present for mobile telephone 1 in mobile radio network 10 in acoustical and/or optical form, for example, through the blinking of a light-emitting diode, through an indicator in the display, and/or through an acoustical signal, such as a ringing tone in a loudspeaker.

In FIG. 3b, a second embodiment is depicted for an evaluation procedure. In this context, the control unit at a program point 300 again checks whether information was transmitted to mobile telephone 1 from mobile radio network 10 during the notification time interval, according to which at least one message is present in mobile radio network 10 for mobile telephone 1. If this is the case, then a branching occurs to a program point 305, otherwise the evaluation procedure is exited. At program point 305, control unit 15 checks to determine the type of the at least one message present for mobile telephone 1 in mobile radio network 10. If control unit 15 establishes at program point 305 that the at least one message is an Internet email message, then it branches to a program point 310 and subsequently, at a program point 325, brings about a connection setup via transmitting device 30 through mobile radio network 10 to an Internet server, in which the Internet email message is stored. Subsequently, a branching occurs to a program point 330, at which the at least one Internet email present for mobile telephone 1 is downloaded from the Internet server via mobile radio network 10 and receiving device 5 into mobile telephone 1. Subsequently, a branching occurs to a program point 335, at which control unit 15 causes the connection to be broken off Then a branching occurs to a program point 360, at which control unit 15 acoustically and/or optically signals on reproducing device 25 the entry of the at least one Internet email in mobile telephone 1. Then the evaluation procedure is exited. If control unit 15 establishes at program point 305 that at least one voice message, for example, in the form of a voice-mail, is present in mobile radio network 10 for mobile telephone 1, then a branching occurs to a program point 315. Subsequently, at a program point 340, a connection is set up by control unit 15 via transmitting device 30 and mobile radio network 10 to a voice-mail box, in which the at least one voice-mail for mobile telephone 1 is stored. Then, at a program point 345, the at least one voice-mail is downloaded from the voice-mail box via mobile radio network 10 and receiving device 5 into mobile telephone 1. Then control unit 15 at a program point 350 causes the set-up connection to be broken off. Then a branching occurs to a program point 360, and the entry of the at least one voice-mail, caused by control unit 15, is signaled acoustically and/or optically on reproducing device 25. If control unit 15 at program point 305 detects that at least one message is present for mobile telephone 1 in mobile radio network 10, which is neither an Internet e-mail nor a voice-mail, then a branching occurs to a program point 320. Then control unit 15 at a program point 355 brings about the connection setup via transmitting device 30 and mobile radio network 10 to a service center, in which this at least one further message is stored. Via this connection, this at least one further message is then transmitted via mobile radio network 10 and receiving device 5 to mobile telephone 1. Then control unit 15 causes the set-up connection to be broken off. Subsequently, a branching occurs to program point 360, at which control unit 15 generates on reproducing device 25 an acoustical and/or optical signaling of the entry of the at least one further message at mobile telephone 1. After program point 360, the evaluation procedure is exited.

A further processing of messages downloaded into mobile telephone 1 from mobile radio network 10 can then take place in response to the switching off of the receive mode and can be constituted by a continuation of the acoustical and/or optical signaling of the downloaded messages or an acoustical and/or optical reproduction of the content of the downloaded messages on reproducing device 25, it being possible to terminate a continuation of the signaling after a predetermined time automatically or as a result of user interaction at input unit 20. The reproduction of the content of the downloaded messages can also take place via input unit 20 on the initiative of the user and, for example, additionally via reproducing device 25 in a menu-controlled manner. An automatic sequential reproduction of the contents of the downloaded messages brought about by control unit 15 is also possible, the content of each downloaded message, by way of example, being able to be reproduced completely or partially for a predetermined time period on reproducing device 25, which, if necessary, could also be prolonged by the user via input unit 20.

The at least one first predetermined time, the second predetermined time period, the third predetermined time period, and the fourth predetermined time can be stipulated by the user at input unit 20 or they can be preset in control unit 15.

What is claimed is:

1. A method of establishing a query mode in a mobile telecommunications terminal, the terminal including a receiving device for receiving messages from a telecommunications network in a receive mode, a control unit to establish a query mode, and a reproduction playback device, the method comprising:
   determining at least one first predetermined time by the mobile telecommunications terminal independently of operation of the telecommunications network;
   in the query mode, from a not connected state in which if the receive mode is switched off such that the mobile telecommunications terminal is not connected to the telecommunications network and is not able to receive an incoming call, activating via the control unit the receive mode to connect to the telecommunications network at the at least one first predetermined time determined by the mobile telecommunications terminal independently of the operation of the telecommunications network;
   checking if information regarding at least one stored message in the telecommunications network for the mobile telecommunications terminal was received in the receiving device within a second predetermined time period of predetermined length after the activation of the receive mode; and
   if said information was received, downloading at least one message after a type thereof has been determined and during a predetermined third time period of predetermined length, the control unit determining a length of the predetermined time period in advance of the downloading of the at least one stored message based on the type and size thereof.

2. The method of claim 1, wherein the control unit switches off the receive mode immediately after expiration of the third predetermined time period beginning from the activation of the receive mode.

3. The method of claim 2, wherein, if the control unit detects reception of information regarding at least one message in the telecommunications network for the mobile telecommunications terminal, the control unit initiates an evaluation of the at least one message.

4. The method of claim 1, wherein, if the control unit detects reception of information regarding at least one message in the telecommunications network for the mobile telecommunications terminal, the control unit initiates an evaluation of the at least one message.

5. The method of claim 4, wherein a type of evaluation can be stipulated via an input unit.

6. The method of claim 5, wherein the type of evaluation is at least in part a function of message type.

7. The method of claim 4, wherein the reproduction playback device receives at least one of acoustical and optical signaling from the control unit during evaluation of the at least one message.

8. The method of claim 7, wherein the control unit maintains signaling to the reproduction playback device after the receive mode is switched off.

9. The method of claim 4, wherein, in the evaluation of the at least one message, the control unit establishes a connection to the telecommunications network via a transmitting device at a fourth predetermined time.

10. The method of claim 1, wherein, in the query mode, the control unit presets the at least one first predetermined time for activating the receive mode as a function of an instantaneously available capacity of a power supply.

11. The method of claim 1, wherein, in the query mode, the control unit activates the receive mode at regular time intervals.

12. The method of claim 1, wherein, in the query mode, the control unit presets the at least one first predetermined time for activating the receive mode as a function of an accessibility of the mobile telecommunications terminal in the telecommunications network during a most recently established receive mode.

* * * * *